Nov. 18, 1958
J. M. MERGEN
2,861,225
MAGNETIC ACTUATORS
Filed April 26, 1955
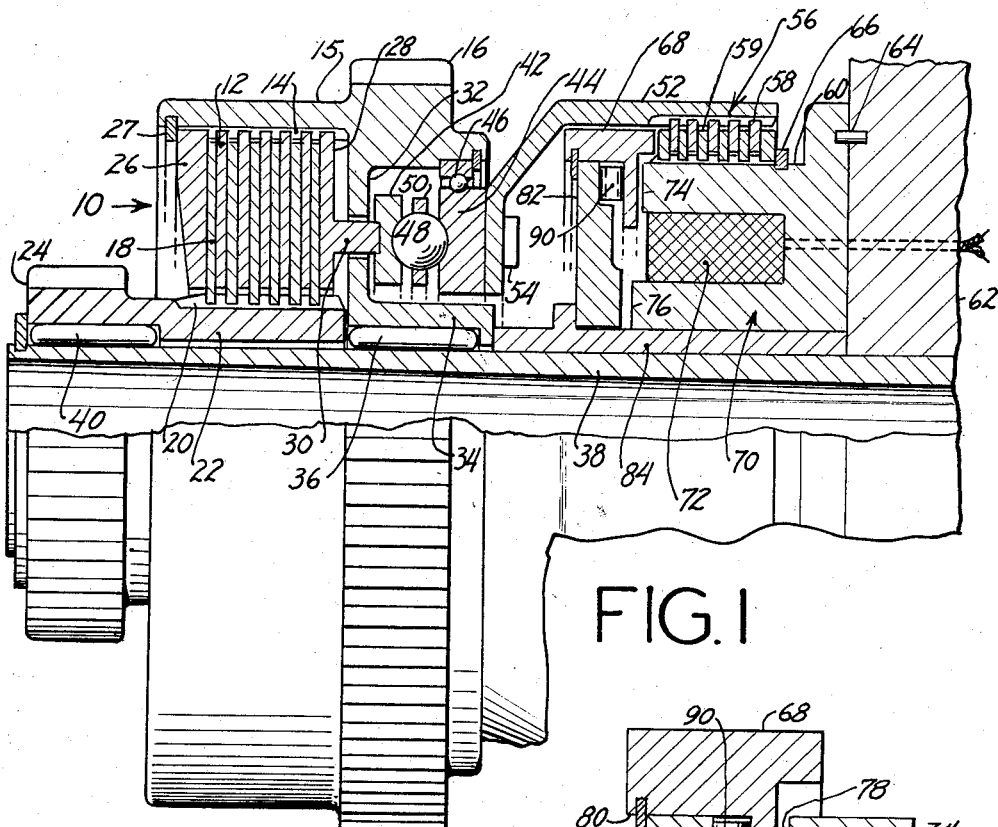
FIG. 1
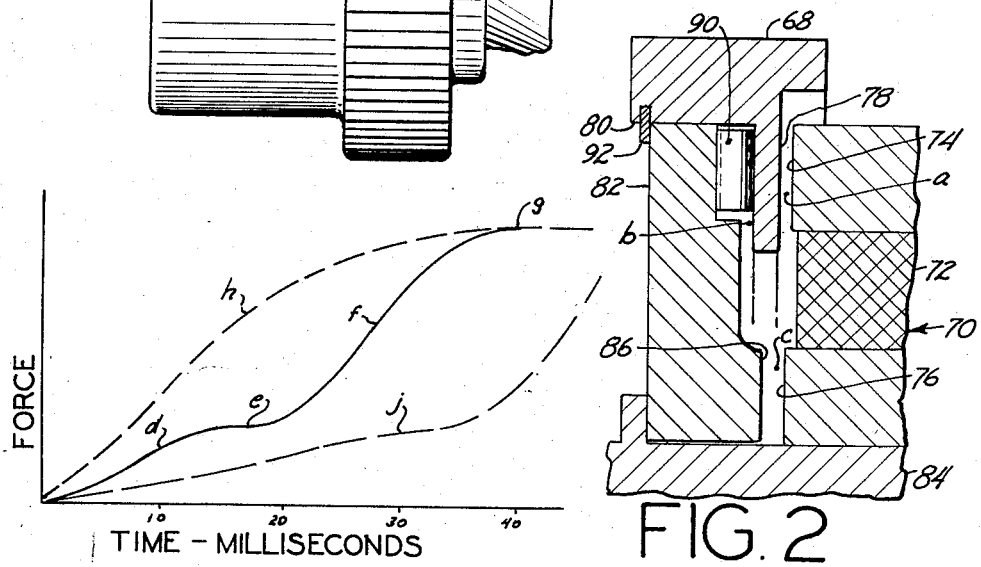
FIG. 3
FIG. 2
INVENTOR
JOSEPH M. MERGEN
BY
*Godfrey B. Speir*
ATTORNEY

United States Patent Office 2,861,225
Patented Nov. 18, 1958

2,861,225

MAGNETIC ACTUATORS

Joseph M. Mergen, Verona, N. J., assignor to Curtiss-Wright Corporation, a corporation of Delaware Application April 26, 1955, Serial No. 504,007

5 Claims. (Cl. 317—189)

This invention relates to electro-magnetically actuated mechanisms, and in particular concerns mechanical clutches which are solenoid operated.

In devices which are operated by solenoids when used in high-speed equipment where inertia effects are significant, difficulties may be encountered where the fast action of a solenoid and its associated armature produces undesirable conditions due to inertia and dynamic effects in the equipment. If the action of the solenoid and its armature is made slightly slower, correction of the trouble may be accomplished. One means of slowing the action of a solenoid and its armature is to provide delay components in the energizing circuits for the solenoid. While this remedy is satisfactory for equipment where weight is not an important factor, it is not satisfactory where the additional weight of components, such as heavy inductances, can ill be afforded.

My invention enables a solenoid to be energized normally and quickly without the use of electrical delay components in solenoid circuit, and inserts mechanical delay action in the armature and associated mechanism which is driven by the solenoid. This arrangement is particularly useful in solenoid-operated mechanical friction clutches, where it may be incorporated with virtually no increase in weight or complication and at very little additional cost.

Objects of the invention are to provide a magnetic delay action device, to provide a delay action electro-magnetically operated friction clutch, and to provide a solenoid mechanism with magnetic elements which operate in series, with delayed action and which, when fully energized, exert the same full force as would be obtained if only a single armature were provided for the solenoid. A further object is to provide a delay action for the engagement of a solenoid operated clutch which will enable smooth and gradual clutch engagement without backlash, for the suppression of inertia and backlash effects.

An embodiment of my invention is shown in the annexed drawings in which similar reference characters designate similar parts and in which:

Fig. 1 is a longitudinal section through a magnetically actuated clutch incorporating the invention, Fig. 2 is an enlarged section through a portion of the mechanism of Fig. 1 and, Fig. 3 is a typical diagram showing engagement characteristics of a clutch with and without the provisions of my invention.

Referring first to Fig. 1, a clutch 10 is shown which comprises a plurality of friction plates 12 keyed to splines 14 on a drum 15 which is integral with a driving gear 16. The clutch also comprises plates 18 interleaved with the plates 12 and keyed to splines 20 on a shaft 22, the shaft having a gear 24 thereon. When the plates 12 and 18 are pressed against one another for frictional engagement power may be transmitted from the gear 16 to the gear 24. When engaging pressure is relieved from the plates 12 and 18, the gear 16 may rotate freely with respect to the driving gear 24. The clutch further comprises a reaction plate 26 splined to the drum 15 and held from axial movement by a snap ring 27 seated in a grove in the drum. Also, an axially movable pressure plate 28 is provided, this also being keyed to the drum 15 and having pins 30 which pass through openings formed in a web 32 of the gear 16. This web is integral with a gear hub 34 carried on needle or roller bearings 36 journalled on a non-rotating shaft 38. The gear 24 is also supported on the shaft 38 by needle or roller bearings 40.

Clutch action is accomplished by a force amplifier comprising a substantially annular, axially waved race 42 fitted to the pins 30, the groove of the race facing the groove of another substantially annular, axially waved race 44, supported in the rim of the gear 16 by a thrust bearing 46. Between the two waved races 42 and 44 are disposed a plurality of bearing balls 48 held in spaced relation around the axis of the assembly by bearing retainer 50. Normally the races 42 and 44 rotate with the gear 16. When the race 44 is retarded in its rotation to a speed less than that of the gear 16, the balls 48 climb the slopes of the waved races and enforce leftward movement of the race 42, thereby exerting leftward force on the pins 30 and engaging the clutch plates 12 and 18 for driving relation. Retardation of the race 44 is accomplished by dragging it with respect to the gear 16. When the dragging force is released, the race 44 will resume rotation with the gear 16 and will advance to its original position to release the clutch plates from engagement and to enable the balls 48 to resume positions in the deepest portions of the grooves of the races 42 and 44. The disengaging action of the clutch, may, if desired, be expedited by the use of several springs between portions of the clutch plates in a manner which is well known in the art.

The clutch mechanism thus far described is shown in application serial number 143,636 filed February 11, 1950, now Patent No. 2,738,045.

According to the present invention, drag on the race 44 is exerted by a drag cup 52 secured to the race 44 as by screws 54. Drag is exerted selectively on the cup 52 by a multiplate slip brake 56 comprising rotating plates 58 splined to the drag cup and stationary plates 59 splined to a member 60 which is secured against rotation to a support 62 as by dowels 64. The reaction on the brake plates 58 and 59 is assumed by a snap ring 66. Engaging force for the brake plates 58 and 59 is provided by an annular member 68 which also forms part of an armature acted upon by a solenoid 70. The solenoid comprises an electrically energized winding 72 embraced in part by the member 60 which is formed as a solenoid core, provided with pole pieces 74 and 76.

The armature part 68 includes an annular portion 78 which lies opposite and in spaced relation to the pole piece 74. Said armature part 68 is also formed with a cylindrical portion 80 slidably retaining a second armature part 82 which is of annular form and which is slidable on a bushing 84, preferably of non-magnetic material. It should be understood that armature parts 68 and 82 are both of magnetic material. The armature part 82 is also provided with a face 86 lying opposite the pole piece 76 in spaced relation thereto. The armature parts 68 and 82 are slidable relative to one another through a short distance represented by a clearance $b$ and are held apart from one another by means of a waved annular spring 90 acting therebetween. The spring is slightly pre-loaded and the armature parts 68 and 82 are held in their disengaged, limiting relation by a lock ring 92 fitted to the armature part 68.

The clearance between the pole pieces 74 and the face 78 of the armature part 68 is designated a; the clearance between the armature parts 68 and 82, b; and the clearance between the face 86 of armature part 82 and pole piece 76, c. Clearance a plus clearance b is substantially equal to clearance c for reasons now to be explained. When the solenoid 70 is energized, magnetic flux passes from pole piece 74 across clearance a to armature part 68 whence it passes to armature part 82 across the sliding joint between the armature parts at cylinder 80. Thence, the magnetic circuit is completed across clearance c to the pole piece 76. As the flux density increases sufficiently, both armature parts will be drawn toward the pole pieces and the clearance a will be substantially closed. Before the armature part 82 can be drawn toward the pole piece 76 to substantially close the magnetic circuit the clearance c must be closed and the force of the spring 90 must be overcome. As the flux density increases, the armature part 82 will be drawn toward the pole piece 76, closing clearance b and substantially closing the remaining portion of clearance c. Thus, there is a slight delay while the flux density builds up to enable attraction of the armature part 82 to substantially close the magnetic circuit. The length of delay depends upon the force exerted by the spring 90 and also by the distance through which the armature part 82 must travel until the magnetic circuit is closed. The time characteristics of this are illustrated in Fig. 3 in solid line. The segment d of the solid line curve shows the approach of the armature portions toward the pole pieces while the clearance a is being closed. Then there is a delay represented by the segment e while the flux builds up to overcome the force exerted by the spring 90. Finally, the segment f represents movement of the armature part 82 toward the pole pieces until full force of the solenoid is exerted as represented by the point g on the curve. A typical time interval for the entire closing may be 40 milliseconds as shown in Fig. 3 but these numerical values may be modified or varied to suit design requirements by varying the armature clearance and the force of the spring 90. Without the delay action above explained, the solenoid device would have characteristics typified by the dotted line curve h, if there were but a single armature instead of the two armature parts 68 and 82. Clearly, the single armature would approach the solenoid pole piece quickly and the armature force also builds up quickly with no delay action.

Functionally, in the clutch environment shown in Fig. 1, the two-part armature produces the effects noted below. When the solenoid is energized, the armature parts 68 and 82 are drawn toward the pole piece 74 with moderate force due to the large air gap clearance a and c, whereupon the armature part 68 engages the brake 56 lightly to exert a light drag on the cup 52. This initiates light energization of the main clutch 10, closing the plates 12 and 18 into contact with one another and into slipping relation. Clearance a is minimized by this action, but clearance c remains relatively large. Continued solenoid energization then, after slight delay, pulls armature part 82 and minimizes clearance c. After armature part 82 moves to the right a few milliseconds later, the additional force exerted thereby produces further force increment on the brake 56 which exerts a greater drag upon the cup 52.

Thereupon, the main clutch 10 is fully pressurized through the action of the balls 48 and the waved races 42 and 44 to fully engage the clutch for non-slipping power transmission from the drive gear 16 to the driven gear 24. In effect, the step action of the clutch actuating mechanism provides for take up of slack or light pre-loading of the main clutch in anticipation of full loading of the clutch. The various components of the mechanism are first conditioned for full load transmission of power so that when the clutch is fully coupled there will be no further movement of the various parts to allow backlash, shock or bouncing effects. Without the delay action, the clutch coupling occurs so quickly from the unloaded condition to the loaded condition, the clearance being taken up in the mechanism during this process, that the clutch has been known to de-couple and re-couple through several oscillations before it reaches a steady-state, coupled position.

When clutch mechanisms of the sort herein contemplated are used in multiple and where the arrangement is such that one clutch should couple when another de-couples, the present invention eliminates the possibility of two clutches being coupled at the same time by which they would fight one another and cause excessive dynamic load on the power transmission system.

Fig. 3 includes a dotted line curve j showing possibilities for extending the action time of the solenoid and armature portions by modifying the design of the armature parts 68 and 82 and of the spring 90, this further delayed action being secured by increasing clearances a, b and c and by increasing the stiffness of spring 90.

The particuar mechanical arrangement of the armature pieces 68 and 82 represents one design of the apparatus which is suitable for the environment chosen for illustration, but which is by no means limiting in respect to the mode of action of the system. Various other arrangements can readily be envisioned for the two armature parts and for the spring in order to attain the desired delayed action in the operation of the mechanism.

While only a single embodiment of the invention has been illustrated and described, it it to be understood that changes and modifications may be made in the arrangement shown which will be within the scope of the invention. For definition of the limits of the invention, reference should be had to the following claims.

I claim:

1. A magnetic actuator comprising a two-pole solenoid, a first armature in proximity to one pole of the solenoid and movable toward and from same, a second armature magnetically coupled to and mounted on the first for movement therewith and relative thereto, and in proximity to the other pole of the solenoid, and resilient means acting between said armatures urging them apart and one of them away from said solenoid.

2. A magnetic actuator comprising a two-pole solenoid, a first armature in proximity to one pole of the solenoid and movable toward and from same, a second armature magnetically coupled to and mounted on the first for movement therewith and relative thereto, and in proximity to the other pole of the solenoid, and resilient means acting between said armatures urging them apart and one of them away from said solenoid, said armatures having engageable abutments whereby the force exerted by the solenoid on said second armature is added to the force exerted by the solenoid on said first armature when said armatures are in abutting engagement.

3. A magnetic actuator comprising a two-pole solenoid, a first armature slidably mounted to move toward and away from said solenoid and having a part overlying one of the poles thereof, a second armature slidably mounted on the first, for movement relative thereto and for movement therewith toward and away from the solenoid, said second armature being in magnetic contact with the first and overlying the other solenoid pole, and resilient means acting between said armatures, urging them apart and urging the second aramture away from the solenoid pole which it overlies.

4. A magnetic actuator according to claim 3 including a stop to limit the relative movement of said armatures and a stop to limit the joint movement of said armatures away from said solenoid.

5. A progressive action electromagnetic device for producing a useful force comprising a solenoid including pole pieces, a first armature mounted for movement toward said pole pieces upon solenoid energization, to produce part of the useful force and to partially close a magnetic flux path, a second armature movable with and relative to said first armature, resilient means between said armatures urging them apart and urging the second away from flux path closing position, the partial closure of the flux path by said first armature serving to increase the flux acting on the second armature whereby it is moved to overcome said resilient means to close the flux path and to increase said useful force.

References Cited in the file of this patent

UNITED STATES PATENTS

| | | |
|---|---|---|
| 593,481 | Lowrie | Nov. 9, 1897 |
| 2,211,701 | McGrath | Aug. 13, 1940 |
| 2,555,215 | Warner | Mar. 29, 1951 |

FOREIGN PATENTS

| | | |
|---|---|---|
| 109,031 | Germany | July 7, 1899 |